(12) United States Patent
Williams et al.

(10) Patent No.: US 11,755,925 B2
(45) Date of Patent: Sep. 12, 2023

(54) COMPUTER-IMPLEMENTED DECISION MANAGEMENT SYSTEMS AND METHODS

(71) Applicant: FAIR ISAAC CORPORATION, Roseville, MN (US)

(72) Inventors: Benjamin Dean Williams, San Jose, CA (US); Fernando Dontati Jorge, Saratoga, CA (US)

(73) Assignee: FAIR ISAAC CORPORATION, Minneapolis, MN (US)

( * ) Notice: Subject to any disclaimer, the term of this patent is extended or adjusted under 35 U.S.C. 154(b) by 774 days.

(21) Appl. No.: 16/352,494

(22) Filed: Mar. 13, 2019

(65) Prior Publication Data

US 2020/0293912 A1 Sep. 17, 2020

(51) Int. Cl.
  *G06N 5/02* (2023.01)
  *G06N 5/022* (2023.01)
  *H04L 67/10* (2022.01)
  *G06F 16/901* (2019.01)

(52) U.S. Cl.
  CPC ......... *G06N 5/022* (2013.01); *G06F 16/9024* (2019.01); *H04L 67/10* (2013.01)

(58) Field of Classification Search
  CPC ...... G06N 5/022; G06N 3/08; G06F 16/9024; G06F 17/18; G06F 17/40; H04L 67/10; G06Q 30/0201; G06Q 40/00
  See application file for complete search history.

(56) References Cited

U.S. PATENT DOCUMENTS

| | | | |
|---|---|---|---|
| 10,728,352 B2* | 7/2020 | Song | H04L 51/043 |
| 2002/0013720 A1* | 1/2002 | Ozono | G06Q 40/06 705/35 |
| 2013/0030851 A1* | 1/2013 | Rahmouni | G06Q 10/00 705/7.11 |
| 2014/0046983 A1* | 2/2014 | Galloway | G06F 16/29 707/798 |
| 2014/0149376 A1* | 5/2014 | Kutaragi | G06F 18/2323 707/706 |

(Continued)

OTHER PUBLICATIONS

U.S. Appl. No. 62/676,187: Systems and Methods for Constructing a Node Graph Using Electronic Activities (filed 2018).*

(Continued)

*Primary Examiner* — Michael Won
(74) *Attorney, Agent, or Firm* — Mintz Levin Cohn Ferris Glovsky and Popeo, P.C.

(57) ABSTRACT

Computer-implemented decision management systems and methods are provided. The method comprises obtaining information associated with factors usable for making a decision from among a plurality of inter-related decisions represented by a plurality of corresponding nodes. The computing environment provides access to resources that store information about relationships among the plurality of nodes. A relationship may be presentable as an edge connecting at least two nodes from among the plurality of nodes. The strength of the relationship between the at least two nodes is measurable and definable based on associations between the inter-related decisions. A valued may be determined that provides a measure for the strength of the relationship between the at least two nodes based on the information associated with the factors and the information about the relationships among the plurality of nodes.

20 Claims, 6 Drawing Sheets

(56) References Cited

U.S. PATENT DOCUMENTS

2018/0018950 A1* 1/2018 Tsuda ................ G06F 3/165
2019/0361934 A1* 11/2019 Rogynskyy ............ G06Q 50/22
2019/0364009 A1* 11/2019 Joseph ................ G06F 16/2272
2020/0252281 A1* 8/2020 Abhyankar ............ H04L 41/083

OTHER PUBLICATIONS

U.S. Appl. No. 62/725,999: Systems and Methods for Updating Node Profiles of a Node Graph Using Electronic Activities and Matching the Same to Record Objects of Systems of Record (filed 2018).*

U.S. Appl. No. 62/747,452: Systems and Methods for Updating Node Profiles of a Node Graph Using Electronic Activities and Matching the Same to Record Objects of Systems of Record (filed 2018).*

* cited by examiner

COMPUTER-IMPLEMENTED DECISION MANAGEMENT SYSTEMS AND METHODS

COPYRIGHT & TRADEMARK NOTICES

A portion of the disclosure of this patent document may contain material, which is subject to copyright protection. The owner has no objection to facsimile reproduction by any one of the patent document or the patent disclosure, as it appears in the Patent and Trademark Office patent file or records, but reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter generally relates to computer-implemented decision management technology and, more particularly, to systems and methods with computer-implemented user interfaces that help identify inter-relationships between various decision assets and provide relevant alerts and notifications.

BACKGROUND

Many organizations have established policies that help define how decisions are made in accordance with certain hierarchical levels. Because of the intertwined nature of associations between multitudes of decision factors, a policy change at one level often affects how decisions are made at other levels.

Due to the complex web of associations that may exist among the various decision factors, it is typically impractical for a human operator or user to have a meaningful understanding of the cause and effect relationships between all the decision factors at different levels. Thus, most decisions are generally made based on known relationships between the goals or needs of the group involved in the decision making process, and without a complete appreciation or accountability for the downstream or upstream consequences.

Management dashboards and scheduling systems are available that provide timelines and track occurrences of events within predefined deadlines. Unfortunately, however, currently available decision management technologies do not have the intelligence or means for predicting or notifying a human operator, in a meaningful way, about how a change in a local decision asset may globally affect other decision assets in different contexts, inside or outside of the organization.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with some implementations of the disclosed subject matter, computer-implemented decision management systems and methods are provided. The method comprises obtaining information associated with factors usable for making a decision from among a plurality of inter-related decisions represented by a plurality of corresponding nodes. The computing environment provides access to resources that store information about relationships among the plurality of nodes. A relationship may be presentable as an edge connecting at least two nodes from among the plurality of nodes. The strength of the relationship between the at least two nodes is measurable and definable based on associations between the inter-related decisions. A valued may be determined that provides a measure for the strength of the relationship between the at least two nodes based on the information associated with the factors and the information about the relationships among the plurality of nodes.

A change to at least a first decision from among a plurality of inter-related decisions may be monitored, based on detecting a change to the information associated with the one or more factors, to determine whether a first change to the at least first decision represented by a first node in the plurality of nodes causes a second change to at least a second decision represented by a second node in the plurality of nodes. A graphical interface may be presented, in response to detecting the first change, wherein the graphical interface comprises at least a representation of the first node, a representation of the second node, and a representation of a relationship between the first node and the second node, strength of the relationship between the first node and the second node being conspicuously ascertainable based on at least one visual characteristic of an edge connecting the first node and the second node.

The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
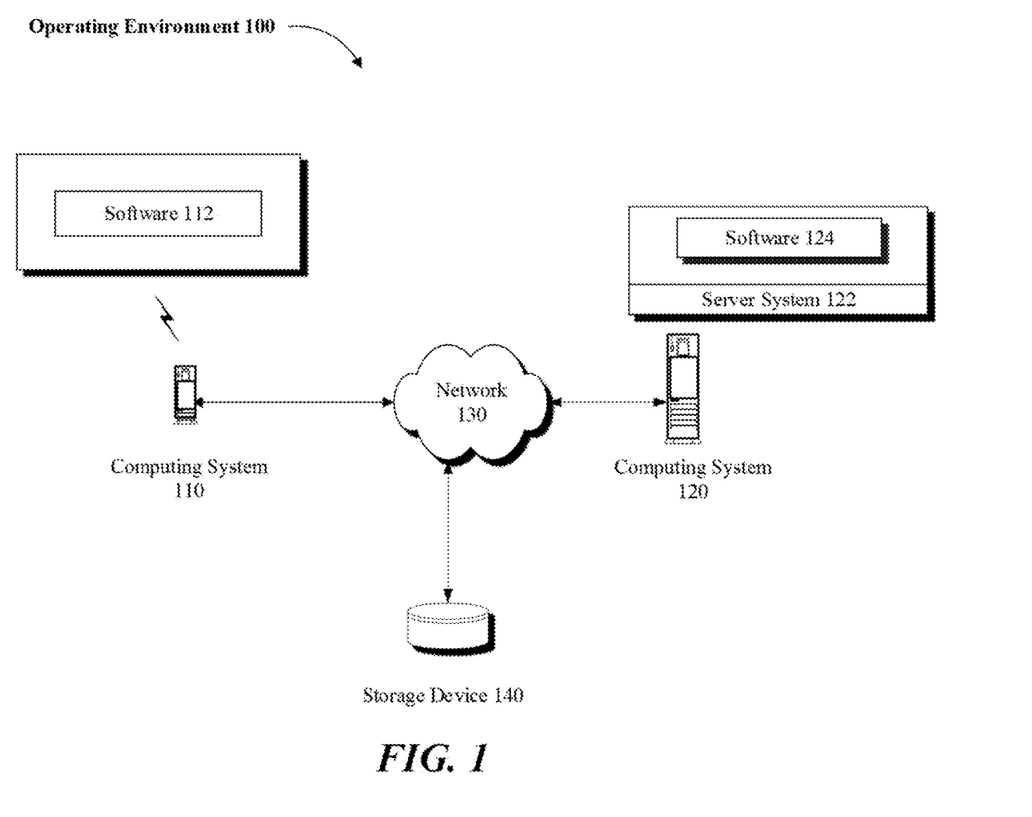
FIG. 1 illustrates an exemplary operating environment, in accordance with one or more embodiments, wherein one or more computing systems may be used to provide decision management services.

Referring to FIG. 1, an example operating environment 100 is illustrated in which a computing system 110 may be used by a user to interact with a decision management software 112 being executed on computing system 110. The computing system 110 may be a general computer, a handheld mobile device (e.g., a smart phone), a tablet (e.g., an Apple iPad®), or other communication capable computing device. Software 112 may be a web browser, a dedicated app or other type of software application running either fully or partially on computing system 110.

Computing system 110 may communicate over a network 130 to access decision-related data stored on storage device 140 or to access decision management services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources, or may be configured as virtual machines that define shared processing or storage resources to implement decision management or decision reporting services. Execution, implementation or instantiation of software 124 or the related features and components (e.g., software objects) over server system 122 may also define a special purpose machine that provides remotely situated client systems, such as computing system 110 or software 112, with access to a variety of decision-related data and decision management services as provided below.

In accordance with one or more implementations, services of the special purpose machine or software 124 may include providing a user, using computing system 110 or software 112, with one or more visual or graphical presentations that identify inter-relationships between various decision assets within one or more organizations or systems (e.g., see FIGS. 3-6). As provided in further detail below, targeted or interesting events relevant to decision making across groups of people working in individual or collaborative computing environments may be monitored to help identify and report the effects of a change in policy on related decisions.

Figure 2:
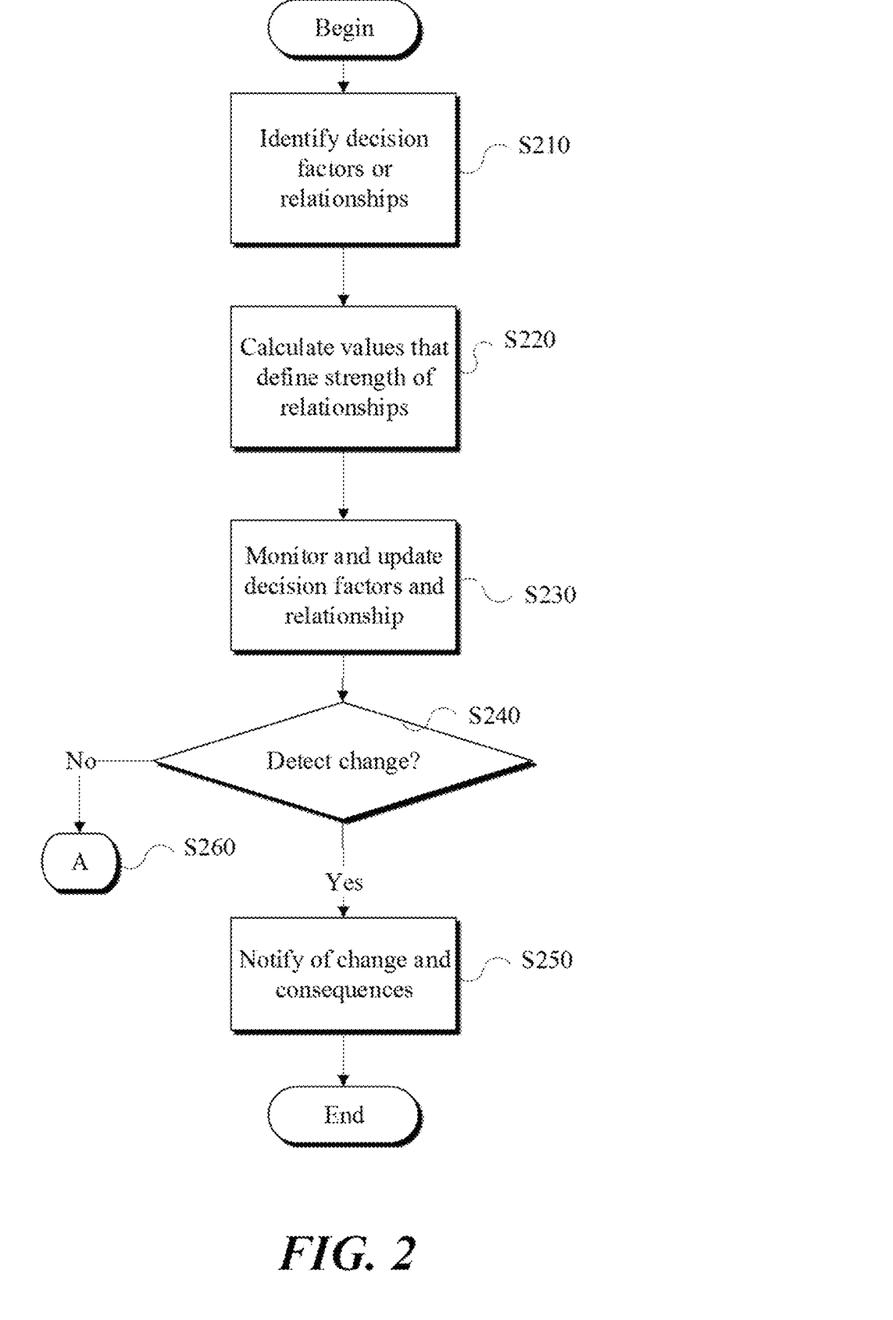
FIG. 2 is an exemplary flow diagram of a method to identify inter-relationships between various decision assets and provide relevant alerts and notifications, in accordance with one or more embodiments.

Referring to FIG. 2, in one implementation, decision factors or relationships therebetween may be identified (S210). For example, results of a decision may be associated with a set of factors, policies, or events that may be related to or may influence the outcomes of other events or decisions. Information about the relationship between the various decision factors may be used to calculate one or more values that define the strength of one or more relationships (S220). Based on the identified relationships between the identified decision factors or related events and the relative strength of the relationships, a data structure (e.g., a table) may be implemented that includes values that define at least one aspect of a related event or factor, or includes direct or indirect pointers and associations to related decision assets, events or factors.

Desirably the one or more values may be used to identify decision results associated with, for example, making a primary decision that affects a secondary decision, and so on, depending on the identified inter-relationships among the decision factors and the related events. Such values, and representations of the relationships between such values, may be implemented in the form of one or more data structures or nodes (e.g., a neural network). The related values, representing relationships between the nodes in the data structure, may be queried to help a user better understand how certain decisions or events influence other decisions or events. The result of a query may be presented in a graphical interface (e.g., as a map, a diagram, a chart, or other meaningful visual presentation) that connects various nodes in a decision hierarchy.

In some implementations, an initial decision data structure or data model may be developed. According to the values and relationships stored in the data structure, events, associations and relationships between various nodes (e.g., containing information about various decision factors or decision assets) may be monitored and updated, as such events take place and as the decision factors and relationships change overtime (S230). The monitoring may include identifying an event or a set of related decisions or identifying a set of factors associated with the identified decisions, either upstream or downstream in the decision hierarchy.

For example, when a change occurs in one node (e.g., Node X), it is determined if that change may influence another node (e.g., Node Y). In some scenarios, changes to one Node X may cause a change or interruption in the functional aspects or results associated with one or more other nodes (e.g., Nodes Y, U, V, W, Z) with which the Node X is associated. When a change is detected (S240), a notification component may be activated to present or alert a user about one or more of the following: the change, the changed node (e.g., Node X) or the respective consequences (e.g., changes to the associated Nodes Y, U, V, W, Z) (S250).

In accordance with some embodiments, if no change is detected, the monitoring may continue or some other appropriate action (e.g., generating a user interface prompt or report) may be taken (S260). The presentation of the change or the result of the change in other nodes (e.g., either upstream, downstream or both) may be accomplished by way of providing a visual representation of the changed node in association with the related nodes (e.g., Node X may be visually displayed as a singular node connected to nodes U, V, W, Y, Z by way of one or more edges).

Figure 3:
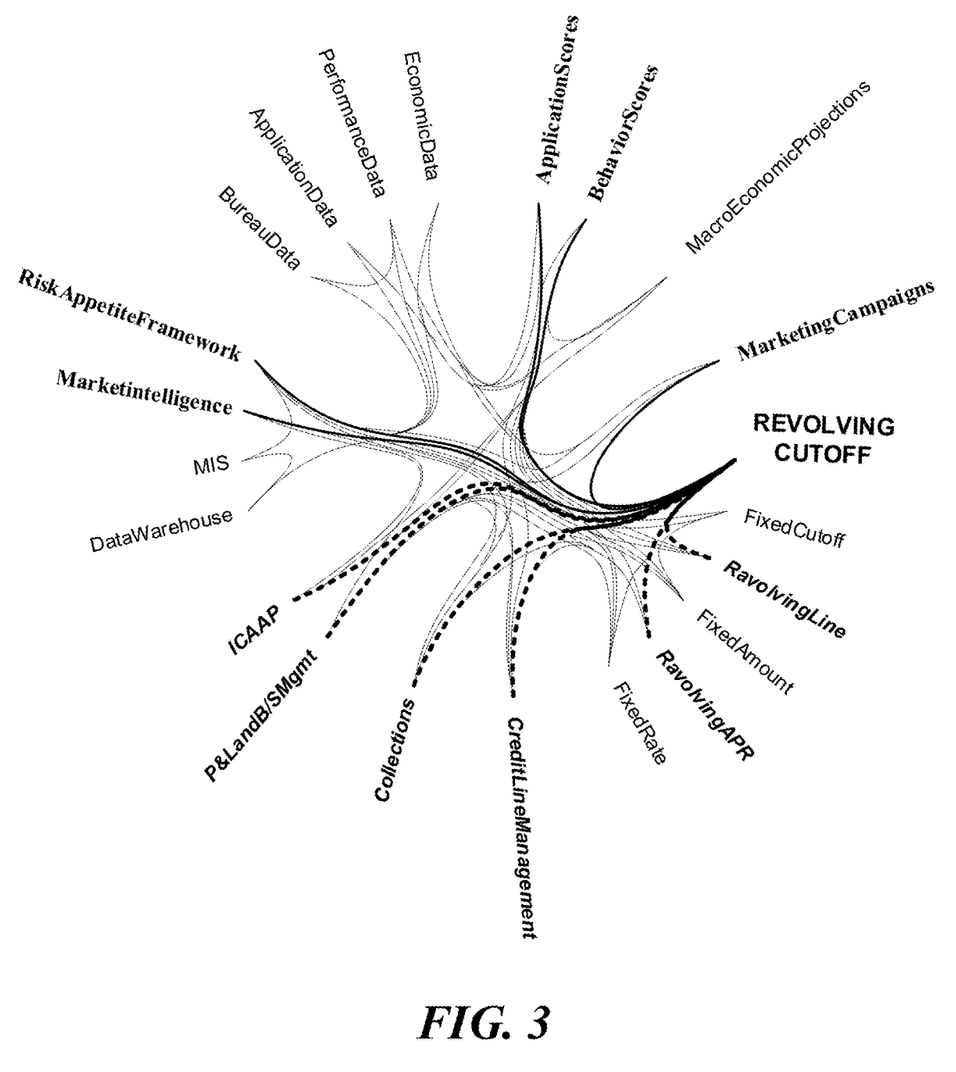
FIGS. 3 through 6 are exemplary diagrams of graphical interfaces implemented to display inter-relationships between various decision assets and provide relevant alerts and notifications, in accordance with one or more embodiments.

Referring to FIG. 3, an example illustration is provided which may be utilized to indicate the relationship between associated nodes, using color-coded edges. By way of a simplified example, a Node Y (e.g., Marketing Campaigns) associated with a changed Node X (e.g., Revolving Cutoff) may be connected via a red edge, indicating a downstream association (i.e., a change in Node X affects Node Y). As another example, a Node W (e.g., ICAAP) associated with the changed Node X may be connected via a green edge, indicating an upstream association (i.e., a change in Node W affects Node X).

It is noteworthy that the color-coding scheme disclosed here and in the accompanying figures is by way of example and shall not be construed as limiting the scope of the disclosed subject matter to the particular schemes or colors.

For example, other colors may be used, or instead of colors, different marking or styles may be used (e.g., dashed lines, dotted lines, highlighting, etc.) that conspicuously distinguish different relationships or relationship strengths among the nodes.

Depending on implementation, some of the related nodes may not be presented if, for example, a change in Node X does not result in a measurable change in a related node U, or if the change in node U does not fall in a threshold range or predetermined set of values (e.g., if the change was below or above or between designated thresholds). In accordance with one or more implementations, some related nodes may be presented at a higher level of hierarchy than other related nodes, for example, depending on the strength or weight of the relationship between nodes.

To illustrate, in an example scenario, both nodes U and V may be associated with Node X. However, Node U may have a stronger relationship with Node X in that, for example, a change in Node X may affect a higher level or a higher rate of change in Node U, in comparison to Node V. Thus, when a notification is generated, the notification associated with Node U may be more prominent than the notification associated with Node V (e.g., the notification may be in a particular color, font, highlighting, or contain other features that may conspicuously notify a user of the change).

Referring back to FIG. 3, a graphical interface including a set of connected nodes (e.g., a connectogram) may be presented to a user, where the graphical interface may indicate the relationship between various decision assets (i.e., nodes). For example, as shown, a decision asset named "Revolving Cutoff" may be directly related to other factors that may be used to determine the creditworthiness of an applicant for financing or credit. Changes to other decision assets or factors (e.g., shown in red in FIG. 3 as "Marketing Campaigns," "Behavior Scores," "Application Scores," etc.) may result in a need to change the Revolving Cutoff. Other decisions assets or factors (e.g., shown in green in FIG. 3 as "Revolving Line," "Revolving APR," "Collections," etc.) may be impacted by a change in the Revolving Cutoff decision asset.

In an example scenario, a user may interact with a graphical interface to select a particular node identifying a decision asset (e.g., Revolving Cutoff). In response to user interaction, the graphical interface may be modified to show a more expansive or a more restrictive view of the displayed nodes and relationships. For example, in FIG. 3, in response to user interaction with the node representing Revolving Cutoff, five red upstream nodes and six green downstream nodes may be displayed. As noted earlier, depending on design, different color coding schemes, line thicknesses and other features and attributes may be utilized to indicate different influences or relationships between different nodes, so that it is easy for a user to at least conceptually understand the real-world or real-time relationships between the various associated decision assets and how or why a change in one decision asset may result in a change in another asset displayed.

Figure 4:
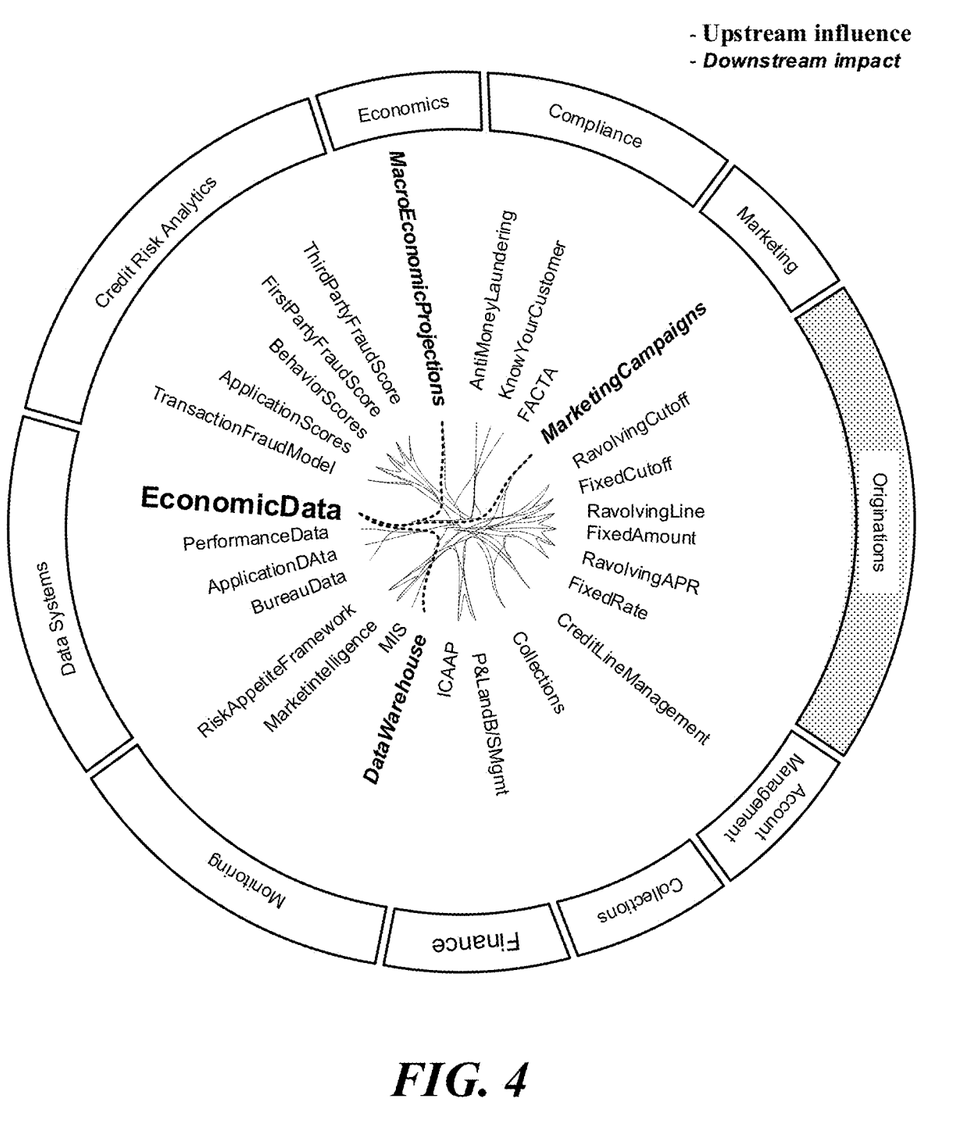
Figure 5:
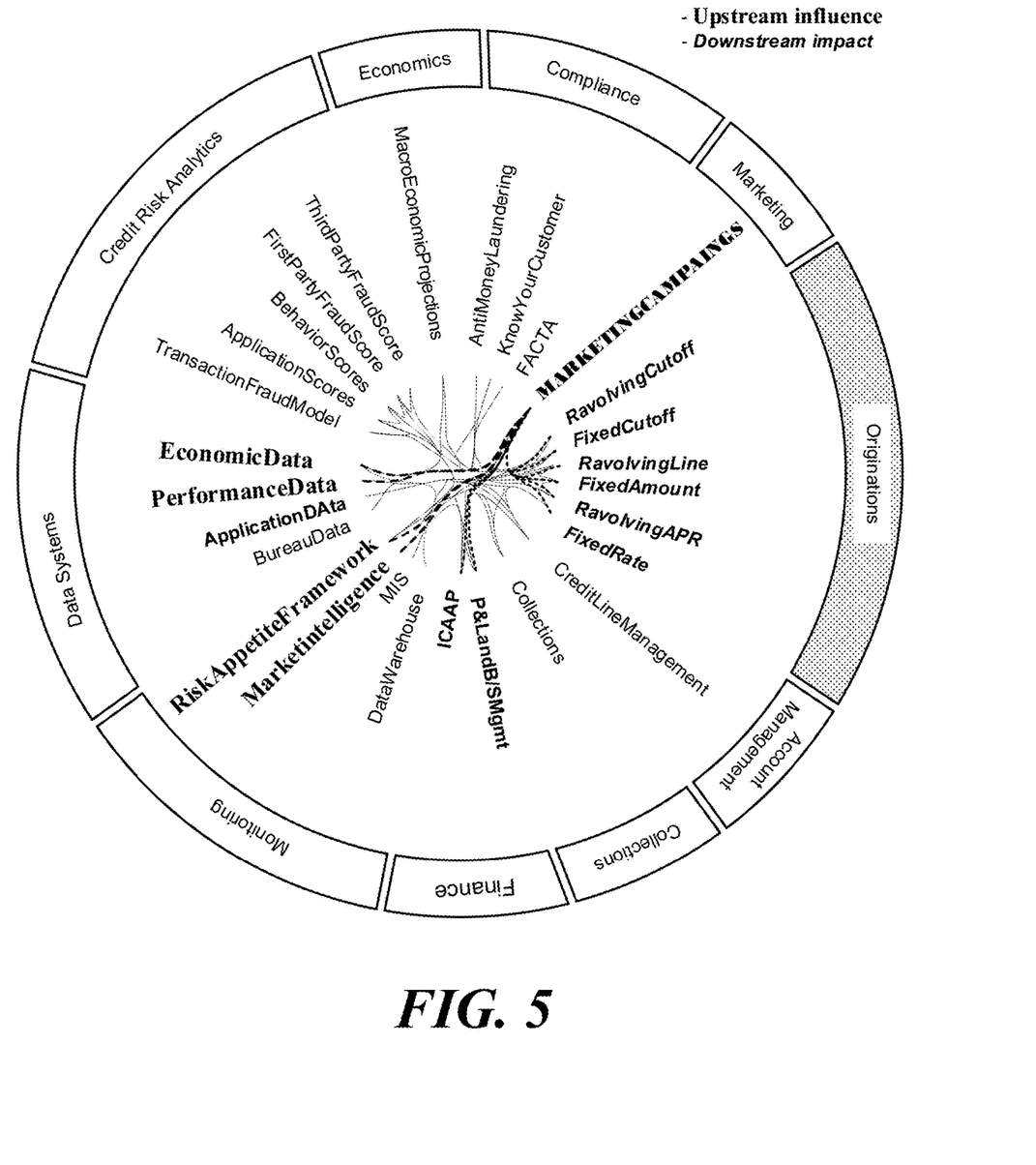
Figure 6:
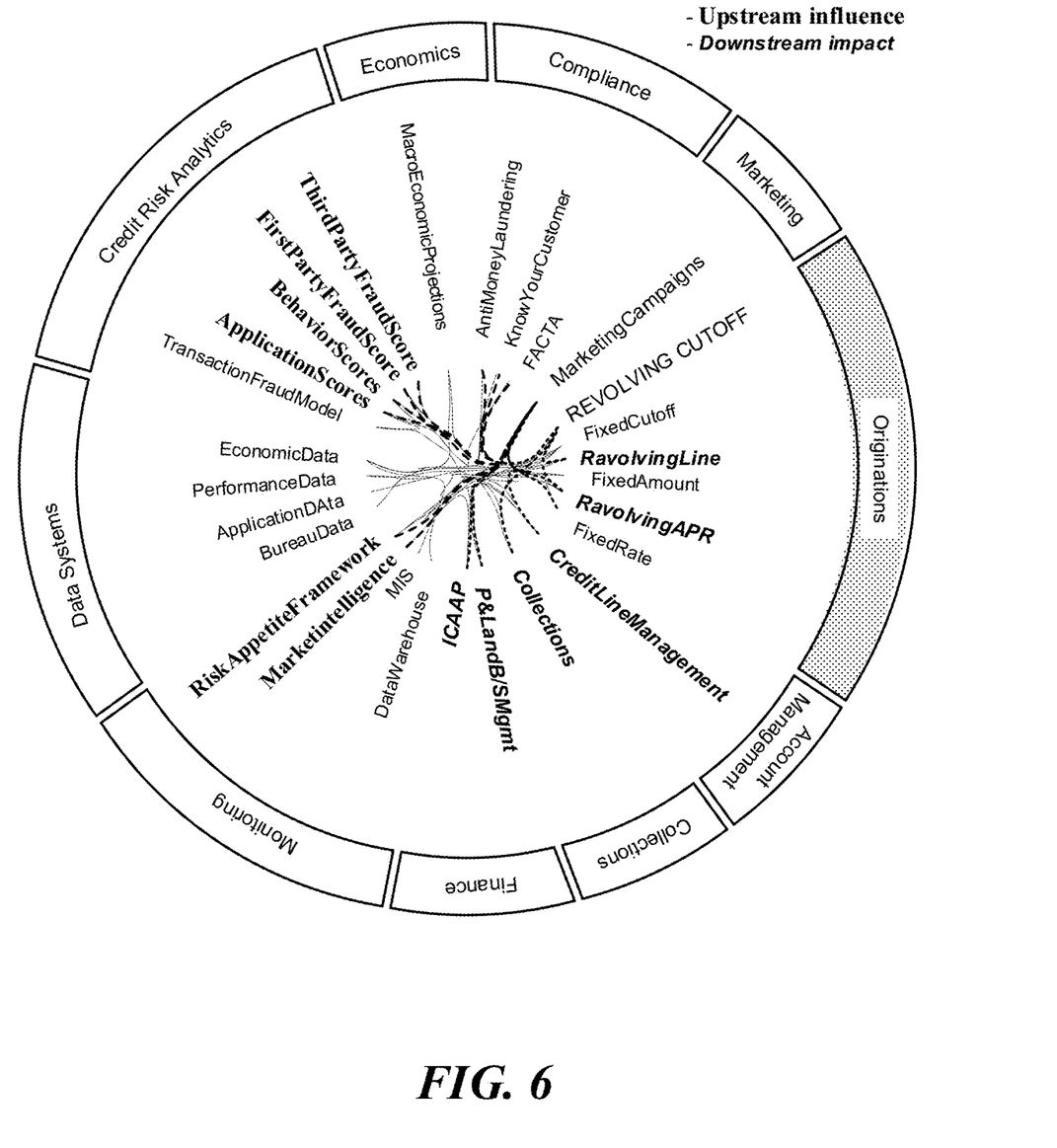

Referring to FIGS. 4 through 6, an example progression in a graphical interface is illustrated as applicable to one or more example decision management scenarios, in accordance with one or more implementations.

Referring to FIG. 4, an example graphical interface is illustrated in which an alert is generated to notify a user about an event (e.g., a rise in interest rates) that may be introduced as a change in economic data in a credit risk analysis ecosystem. As shown, in addition to conspicuously displaying three related downstream decision assets (e.g., Macro Economic Projections, Marketing Campaigns, Data Warehouse), four corresponding categories (e.g., Data Systems, Economics, Marketing and Monitoring) in which the changes may take place are also identified. As such, viewing the graphical interface of FIG. 4, a user may easily understand that a change or an event in Economic Data has taken place, and that such change may affect the identified downstream decisions related to macro-economic projections, marketing campaigns and data warehousing, for example.

Referring to FIG. 5, as a continuation of the above example scenario, a decision asset represented by a node named "Marketing Campaigns" may be selected. In response, additional decision assets associated with the selected node may be also displayed. As shown, eight downstream decision assets and four upstream decision assets may be presented, for example. As noted above with respect to FIG. 4, the displayed features associated with the downstream decision assets may primarily fit within categories identified in, for example, the outer edge or rim of the graphical interface as affecting "Originations" (e.g., with respect to four out of six of the downstream decision assets) and "Finance" (e.g., with respect to two of the downstream decision assets).

Referring to FIG. 6, further user interaction with the example graphical interface, shown in FIGS. 4 and 5, may result in upstream influential nodes or factors to be displayed (e.g., 10 decision assets in categories related to Credit Risk Analytics, Compliance, Marketing, and Monitoring). As provided earlier, in at least one aspect, one or more downstream additional impacted nodes may also be displayed to help identify and report, by way of a simple illustrative graphical interface, the potential or expected effects of a singular or plurality of changes in the presented financial ecosystem.

In one or more embodiments, an identification or notification component may be implemented to allow a user to subscribe to one or more decision assets. In this manner, when a change to a decision asset is detected, a user who has subscribed to a data feed or data stream associated with the changed decision asset may be provided with a graphical interface that shows the changed decision asset as well as one or more relevant downstream or upstream decision assets associated with the changed asset. In some implementations, the upstream or downstream assets displayed may be those that are affected, as a result of a change to the underlying changed asset, beyond a certain threshold.

For example, a changed asset X may be associated with multiple other assets upstream or downstream, such as assets U1, U2, D1, D2, D3. A first type of change to asset X may affect a change in assets U1, D1 and D2. A second type of change to the same asset X may affect a change in assets U1, U2 and D3. According to one or more embodiments, when the first type of change to X is detected (and, for example, the amount of such change exceeds a first threshold), the graphical interface may be updated to display X in addition to U1, D1 and D2. When the second type of change is detected (and, for example, the amount of such change exceeds a second threshold), the graphical interface may display X in addition to U1, U2 and D3. As such, the graphical interface may be configured to present changes and the results of the changes in particular contexts for one or more decision assets based on the type of change or a threshold associated with the change or a combination of both.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

What is claimed is:

1. A computer-implemented method comprising:
presenting a graphical interface view displaying information associated with one or more factors usable for making at least one decision from among a plurality of inter-related decisions represented by a plurality of connected nodes each identifying a decision asset of a plurality of decision assets, the plurality of connected nodes implemented in a computing environment by way of one or more data structures, wherein the computing environment provides access to resources that store information about a plurality of relationships among the plurality of connected nodes, and wherein the first graphical interface view presents each relationship of the plurality of relationships as an edge connecting two nodes from among the plurality of nodes;
determining a measure of a strength of the relationship between a selected node of the plurality of nodes and each of a plurality of upstream nodes and downstream nodes affected by changes in the selected node, first amounts of change occurring for each of a first subset of the plurality of upstream nodes and downstream nodes due to a first type of change to the selected node, and second amounts of change occurring for each of a second subset of the plurality of upstream nodes and downstream nodes due to a second type of change to the selected node, the determining comprising use of information associated with the one or more factors and the information about the plurality of relationships among the plurality of nodes;
first presenting, after detecting the first type of change to the selected node and determining that the first amounts of change for the first subset of the plurality of upstream nodes and downstream nodes are above a first threshold, a first graphical interface view displaying the selected node and the first subset of the plurality of upstream nodes and downstream nodes; and
second presenting, after detecting the second type of change to the selected node and determining that the second amounts of change for the second subset of the plurality of upstream nodes and downstream nodes are above a second threshold, a second graphical interface view displaying the selected node and the first subset of the plurality of upstream nodes and downstream nodes;
wherein the first presenting and the second presenting display changes and the result of the changes in particular contexts for the selected node.

2. The computer-implemented method of claim 1, wherein the upstream nodes are at a higher level with respect to the selected node in a hierarchy according to which at least a subset of the plurality of inter-related decisions are associated and ordered, and wherein the downstream nodes are at a lower level with respect to the selected node in the hierarchy.

3. The computer-implemented method of claim 1, wherein the first graphical interface comprises:
   a first graphical feature comprising at least the representation of the selected node, the representations of the first subset of the upstream and downstream nodes, and the representation of the relationship between the selected node and the first subset of the upstream and downstream nodes; and
   a second graphical feature comprising one or more categories to which at least one of the selected node or one or more of the first subset of the upstream and downstream nodes belong.

4. The computer-implemented method of claim 3, wherein the second graphical feature at least partially surrounds the first graphical feature, such that a first group of nodes belonging to a first category from among the one or more categories is aligned with the first category, and a second group of nodes belonging to a second category from among the one or more categories is aligned with the second category.

5. The computer-implemented method of claim 1, wherein the one or more factors comprise at least one of an event or a decision asset, such that a data stream associated with said event or decision asset is subscribable for the purpose of at least one of:
   monitoring at the occurrence of the event or a change to the decision asset, and
   receiving notifications about downstream or upstream affects for at least one of the occurrence of the event or the change to the decision asset.

6. The computer-implemented method of claim 1, wherein the second graphical interface comprises:
   a first graphical feature comprising at least the representation of the selected node, the representations of the second subset of the upstream and downstream nodes, and the representation of the relationship between the selected node and the second subset of the upstream and downstream nodes; and
   a second graphical feature comprising one or more categories to which at least one of the selected node or one or more of the second subset of the upstream and downstream nodes belong.

7. The computer-implemented method of claim 6, wherein the second graphical feature at least partially surrounds the second graphical feature, such that a first group of nodes belonging to a first category from among the one or more categories is aligned with the first category, and a second group of nodes belonging to a second category from among the one or more categories is aligned with the second category.

8. A computer-program product comprising a non-transitory machine readable medium storing instructions, which, when executed by one or more programmable processors, result in operations comprising:
   presenting a graphical interface view displaying information associated with one or more factors usable for making at least one decision from among a plurality of inter-related decisions represented by a plurality of connected nodes each identifying a decision asset of a plurality of decision assets, the plurality of connected nodes implemented in a computing environment by way of one or more data structures, wherein the computing environment provides access to resources that store information about a plurality of relationships among the plurality of connected nodes, and wherein the first graphical interface view presents each relationship of the plurality of relationships as an edge connecting two nodes from among the plurality of nodes;
   determining a measure of a strength of the relationship between a selected node of the plurality of nodes and each of a plurality of upstream nodes and downstream nodes affected by changes in the selected node, first amounts of change occurring for each of a first subset of the plurality of upstream nodes and downstream nodes due to a first type of change to the selected node, and second amounts of change occurring for each of a second subset of the plurality of upstream nodes and downstream nodes due to a second type of change to the selected node, the determining comprising use of information associated with the one or more factors and the information about the plurality of relationships among the plurality of nodes;
   first presenting, after detecting the first type of change to the selected node and determining that the first amounts of change for the first subset of the plurality of upstream nodes and downstream nodes are above a first threshold, a first graphical interface view displaying the selected node and the first subset of the plurality of upstream nodes and downstream nodes; and
   second presenting, after detecting the second type of change to the selected node and determining that the second amounts of change for the second subset of the plurality of upstream nodes and downstream nodes are above a second threshold, a second graphical interface view displaying the selected node and the first subset of the plurality of upstream nodes and downstream nodes;
   wherein the first presenting and the second presenting display changes and the result of the changes in particular contexts for the selected node.

9. The computer-implemented method of claim 8, wherein the upstream nodes are at a higher level with respect to the selected node in a hierarchy according to which at least a subset of the plurality of inter-related decisions are associated and ordered, and wherein the downstream nodes are at a lower level with respect to the selected node in the hierarchy.

10. The computer-program product of claim 8, wherein the first graphical interface comprises:
    a first graphical feature comprising at least the representation of the selected node, the representations of the first subset of the upstream and downstream nodes, and the representation of the relationship between the selected node and the first subset of the upstream and downstream nodes; and
    a second graphical feature comprising one or more categories to which at least one of the selected node or one or more of the first subset of the upstream and downstream nodes belong.

11. The computer-program product of claim 10, wherein the second graphical feature at least partially surrounds the first graphical feature, such that a first group of nodes belonging to a first category from among the one or more categories is aligned with the first category, and a second group of nodes belonging to a second category from among the one or more categories is aligned with the second category.

12. The computer-program product of claim 8, wherein the second graphical interface comprises:
    a first graphical feature comprising at least the representation of the selected node, the representations of the second subset of the upstream and downstream nodes, and the representation of the relationship between the selected node and the second subset of the upstream and downstream nodes; and a second graphical feature comprising one or more categories to which at least one of the selected node or one or more of the second subset of the upstream and downstream nodes belong.

13. The computer-program product of claim 12, wherein the second graphical feature at least partially surrounds the second graphical feature, such that a first group of nodes belonging to a first category from among the one or more categories is aligned with the first category, and a second group of nodes belonging to a second category from among the one or more categories is aligned with the second category.

14. The computer-program product of claim 8, wherein the one or more factors comprise at least one of an event or a decision asset, such that a data stream associated with said event or decision asset is subscribable for the purpose of at least one of:

monitoring at the occurrence of the event or a change to the decision asset, and receiving notifications about downstream or upstream affects for at least one of the occurrence of the event or the change to the decision asset.

15. A system comprising:

at least one programmable processor; and a machine-readable medium storing instructions, which, when executed by the at least one programmable processor, cause the at least one programmable processor to perform operations comprising:

presenting a graphical interface view displaying information associated with one or more factors usable for making at least one decision from among a plurality of inter-related decisions represented by a plurality of connected nodes each identifying a decision asset of a plurality of decision assets, the plurality of connected nodes implemented in a computing environment by way of one or more data structures, wherein the computing environment provides access to resources that store information about a plurality of relationships among the plurality of connected nodes, and wherein the first graphical interface view presents each relationship of the plurality of relationships as an edge connecting two nodes from among the plurality of nodes;

determining a measure of a strength of the relationship between a selected node of the plurality of nodes and each of a plurality of upstream nodes and downstream nodes affected by changes in the selected node, first amounts of change occurring for each of a first subset of the plurality of upstream nodes and downstream nodes due to a first type of change to the selected node, and second amounts of change occurring for each of a second subset of the plurality of upstream nodes and downstream nodes due to a second type of change to the selected node, the determining comprising use of information associated with the one or more factors and the information about the plurality of relationships among the plurality of nodes;

first presenting, after detecting the first type of change to the selected node and determining that the first amounts of change for the first subset of the plurality of upstream nodes and downstream nodes are above a first threshold, a first graphical interface view displaying the selected node and the first subset of the plurality of upstream nodes and downstream nodes; and second presenting, after detecting the second type of change to the selected node and determining that the second amounts of change for the second subset of the plurality of upstream nodes and downstream nodes are above a second threshold, a second graphical interface view displaying the selected node and the first subset of the plurality of upstream nodes and downstream nodes;

wherein the first presenting and the second presenting display changes and the result of the changes in particular contexts for the selected node.

16. The system of claim 15, wherein the upstream nodes are at a higher level with respect to the selected node in a hierarchy according to which at least a subset of the plurality of inter-related decisions are associated and ordered, and wherein the downstream nodes are at a lower level with respect to the selected node in the hierarchy.

17. The system of claim 15, wherein the first graphical interface comprises:

a first graphical feature comprising at least the representation of the selected node, the representations of the first subset of the upstream and downstream nodes, and the representation of the relationship between the selected node and the first subset of the upstream and downstream nodes; and a second graphical feature comprising one or more categories to which at least one of the selected node or one or more of the first subset of the upstream and downstream nodes belong.

18. The system of claim 17, wherein the second graphical feature at least partially surrounds the first graphical feature, such that a first group of nodes belonging to a first category from among the one or more categories is aligned with the first category, and a second group of nodes belonging to a second category from among the one or more categories is aligned with the second category.

19. The system of claim 15, wherein the second graphical interface comprises:

a first graphical feature comprising at least the representation of the selected node, the representations of the second subset of the upstream and downstream nodes, and the representation of the relationship between the selected node and the second subset of the upstream and downstream nodes; and a second graphical feature comprising one or more categories to which at least one of the selected node or one or more of the second subset of the upstream and downstream nodes belong.

20. The system of claim 19, wherein the second graphical feature at least partially surrounds the second graphical feature, such that a first group of nodes belonging to a first category from among the one or more categories is aligned with the first category, and a second group of nodes belonging to a second category from among the one or more categories is aligned with the second category.

* * * * *